US012675877B2

(12) United States Patent
Jie et al.

(10) Patent No.: US 12,675,877 B2
(45) Date of Patent: *Jul. 7, 2026

(54) DETECTION MODEL TRAINING METHOD AND APPARATUS, COMPUTER DEVICE AND STORAGE MEDIUM

(71) Applicant: Tencent Technology (Shenzhen) Company Limited, Shenzhen (CN)

(72) Inventors: Zequn Jie, Shenzhen (CN); Jiashi Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 287 days.

This patent is subject to a terminal disclaimer.

(21) Appl. No.: 18/386,229

(22) Filed: Nov. 1, 2023

(65) Prior Publication Data

US 2024/0062369 A1 Feb. 22, 2024

Related U.S. Application Data

(63) Continuation of application No. 17/458,110, filed on Aug. 26, 2021, now Pat. No. 11,842,487, which is a
(Continued)

(30) Foreign Application Priority Data

Jun. 18, 2019 (CN) .......................... 201910528002.0

(51) Int. Cl.
G06T 7/00 (2017.01)
G06N 20/20 (2019.01)
(Continued)

(52) U.S. Cl.
CPC ........... G06T 7/0012 (2013.01); G06N 20/20 (2019.01); G06T 7/11 (2017.01); G06T 7/174 (2017.01);
(Continued)

(58) Field of Classification Search
CPC ......... G06T 7/0012; G06T 7/11; G06T 7/174; G06T 7/70; G06T 2207/20021;
(Continued)

(56) References Cited

U.S. PATENT DOCUMENTS 8,488,863 B2 7/2013 Boucheron
9,047,678 B2 6/2015 O'Hara et al.
(Continued)

FOREIGN PATENT DOCUMENTS

CN 106529565 A 3/2017
CN 109697460 A 4/2019
(Continued)

OTHER PUBLICATIONS

Tencent Technology, European Office Action, EP Patent Application No. 20827868.9, Sep. 20, 2024, 6 pgs.
(Continued)

*Primary Examiner* — Manav Seth
(74) *Attorney, Agent, or Firm* — Morgan, Lewis & Bockius LLP

(57) ABSTRACT

A computer device segments a first sample region to obtain a candidate image region set that includes a plurality of candidate image regions. For each of the candidate image regions, the device obtains a first relationship degree corresponding to each candidate image region and obtains a second relationship degree corresponding to the candidate image region. The device obtains a relationship degree change value based on the first relationship degree and the second relationship degree. The device selects, from the plurality of candidate image regions, a first candidate image region as a target image region in accordance with a determination that the first candidate image region satisfies a condition in the relationship degree change value. The
(Continued)

device performs model training based on the target image region to obtain a target detection model.

17 Claims, 11 Drawing Sheets

Related U.S. Application Data continuation of application No. PCT/CN2020/095854, filed on Jun. 12, 2020.

(51) Int. Cl.

| | |
|---|---|
| *G06T 7/11* | (2017.01) |
| *G06T 7/174* | (2017.01) |
| *G06T 7/70* | (2017.01) |
| *G06V 10/26* | (2022.01) |
| *G06V 10/774* | (2022.01) |
| *G06V 10/82* | (2022.01) |

(52) U.S. Cl.
CPC ................ *G06T 7/70* (2017.01); *G06V 10/26* (2022.01); *G06V 10/774* (2022.01); *G06V 10/82* (2022.01); *G06T 2207/20021* (2013.01); *G06T 2207/20081* (2013.01)

(58) Field of Classification Search
CPC .......... G06T 2207/20081; G06N 20/20; G06V 10/82; G06V 10/26; G06V 10/774
See application file for complete search history.

(56) References Cited

U.S. PATENT DOCUMENTS

| | | | |
|---|---|---|---|
| 9,911,053 B2 | 3/2018 | Miyano | |
| 10,115,189 B2 | 10/2018 | Kasahara | |
| 10,319,094 B1 | 6/2019 | Chen et al. | |
| 10,366,785 B2 | 7/2019 | Wakasugi et al. | |
| 10,424,064 B2 * | 9/2019 | Price ........................ | G06N 3/09 |
| 10,885,365 B2 | 1/2021 | Fang et al. | |
| 10,984,907 B2 | 4/2021 | Wakasugi et al. | |
| 11,367,273 B2 * | 6/2022 | Du ........................ | G06N 3/0464 |
| 11,538,262 B2 | 12/2022 | Barkan et al. | |
| 11,842,487 B2 * | 12/2023 | Jie ........................ | G06T 7/0012 |
| 2007/0201747 A1 | 8/2007 | Yamada et al. | |
| 2017/0011523 A1 | 1/2017 | Magai et al. | |
| 2021/0012127 A1 | 1/2021 | Chen et al. | |
| 2021/0390706 A1 | 12/2021 | Jie et al. | |

FOREIGN PATENT DOCUMENTS

| | | |
|---|---|---|
| CN | 110245662 A | 9/2019 |
| CN | 110490202 A | 11/2019 |
| CN | 110599503 A | 12/2019 |
| JP | 2016143353 A | 8/2016 |

OTHER PUBLICATIONS

Tencent Technology, Korean Office Action, KR Patent Application No. 10-2021-7029167, Feb. 18, 2024, 6 pgs.

Extended European Search Report, EP20827868.9, Jul. 15, 2022, 9 pgs.

Jordi Pont-Tuset et al., "Multiscale Combinatorial Grouping for Image Segmentation and Object Proposal Generation", IEEE Transactions on Pattern Analysis and Machine Intelligence, IEEE Computer Society, USA, vol. 39, No. 1, Jan. 1, 2017, XP011635519, 13 pgs.

Tencent Technology, ISRWO, PCT/CN2020/095854, Sep. 23, 2020, 7 pgs.

Tencent Technology, IPRP, PCT/CN2020/095854, Dec. 21, 2021, 6 pgs.

Tencent Technology Co., Ltd., Japanese Office Action, JP Patent Application No. 2021544225, Jul. 19, 2022, 4 pgs.

Tencent Technology, Korean Office Action, KR Patent Application No. 10-2021-7029167, Jul. 30, 2023, 11 pgs.

Zequn Jie et al., "Deep Self-Taught Learning for Weakly Supervised Object Localization", 2017 IEEE Conference on Computer Vision and Pattern Recognition, Nov. 9, 2017, 9 pgs.

Zongyong Cui et al., "SAR Target Recognition in Large Scene Images via Region-Based Convolutional Neural Networks", Remote Sensing Image Processing, 2018, 19 pgs.

* cited by examiner

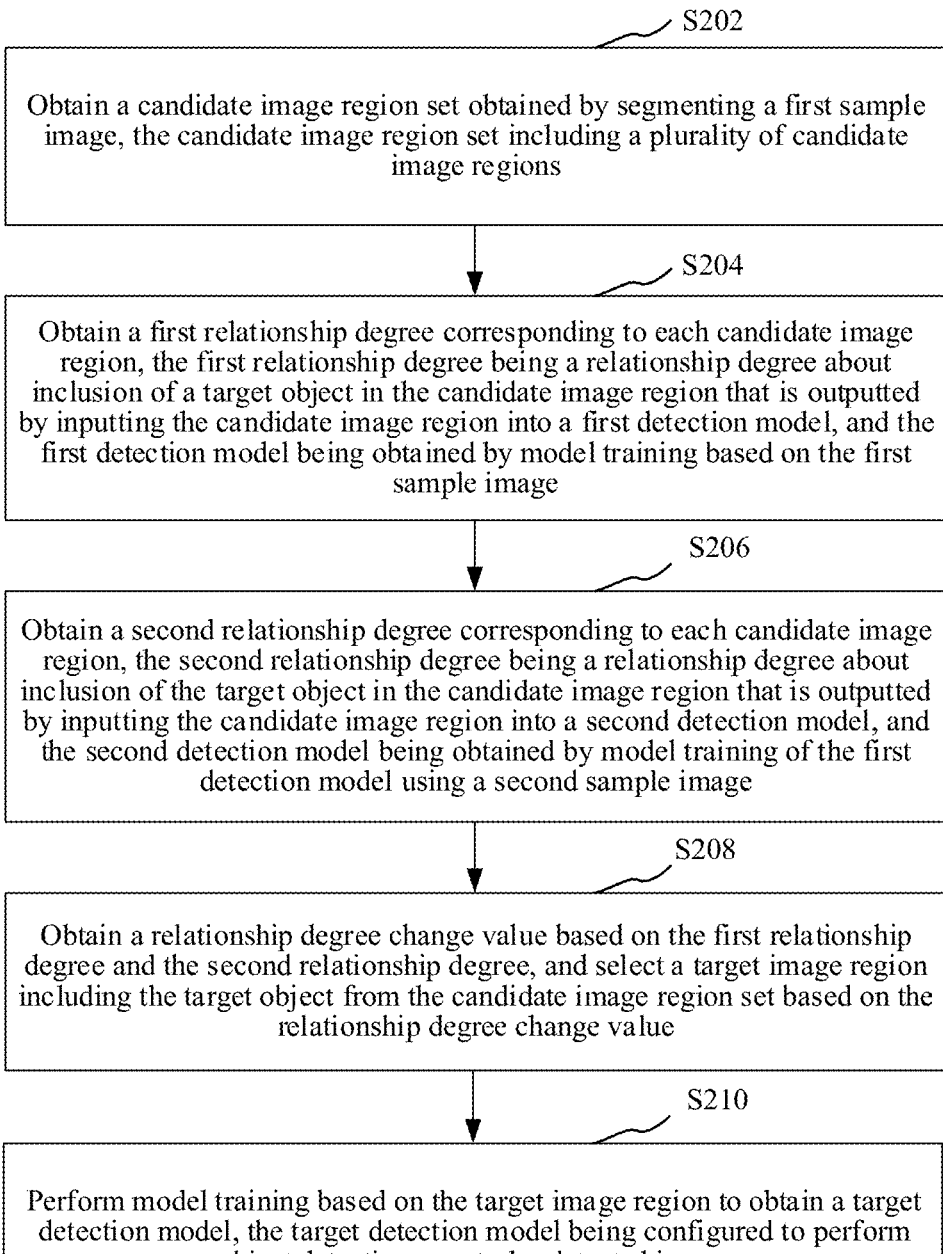

S202

Obtain a candidate image region set obtained by segmenting a first sample image, the candidate image region set including a plurality of candidate image regions

S204

Obtain a first relationship degree corresponding to each candidate image region, the first relationship degree being a relationship degree about inclusion of a target object in the candidate image region that is outputted by inputting the candidate image region into a first detection model, and the first detection model being obtained by model training based on the first sample image

S206

Obtain a second relationship degree corresponding to each candidate image region, the second relationship degree being a relationship degree about inclusion of the target object in the candidate image region that is outputted by inputting the candidate image region into a second detection model, and the second detection model being obtained by model training of the first detection model using a second sample image

S208

Obtain a relationship degree change value based on the first relationship degree and the second relationship degree, and select a target image region including the target object from the candidate image region set based on the relationship degree change value

S210

Perform model training based on the target image region to obtain a target detection model, the target detection model being configured to perform object detection on a to-be-detected image

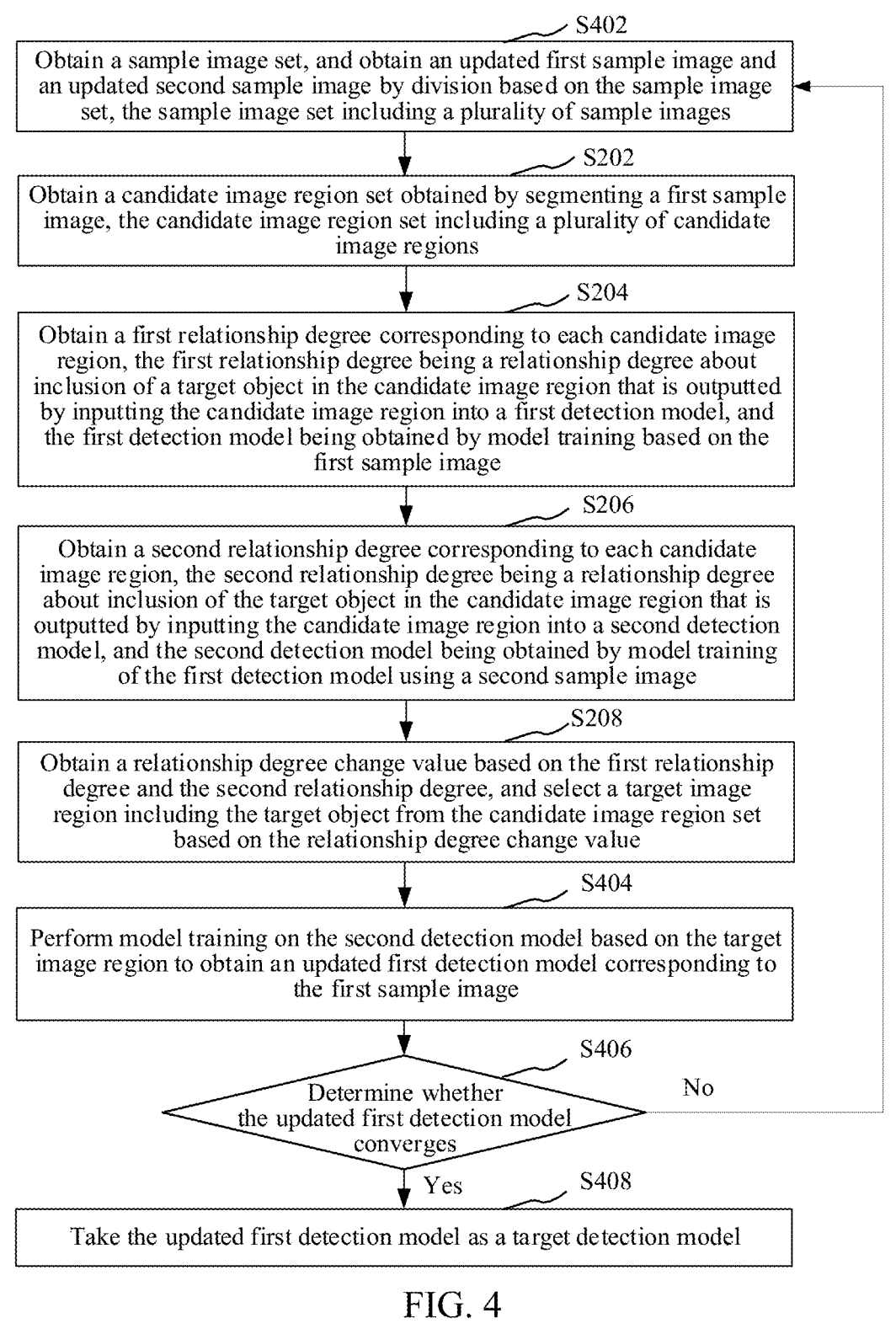

Obtain a sample image set, and obtain an updated first sample image and an updated second sample image by division based on the sample image set, the sample image set including a plurality of sample images

S202

Obtain a candidate image region set obtained by segmenting a first sample image, the candidate image region set including a plurality of candidate image regions

S204

Obtain a first relationship degree corresponding to each candidate image region, the first relationship degree being a relationship degree about inclusion of a target object in the candidate image region that is outputted by inputting the candidate image region into a first detection model, and the first detection model being obtained by model training based on the first sample image

S206

Obtain a second relationship degree corresponding to each candidate image region, the second relationship degree being a relationship degree about inclusion of the target object in the candidate image region that is outputted by inputting the candidate image region into a second detection model, and the second detection model being obtained by model training of the first detection model using a second sample image

S208

Obtain a relationship degree change value based on the first relationship degree and the second relationship degree, and select a target image region including the target object from the candidate image region set based on the relationship degree change value

S404

Perform model training on the second detection model based on the target image region to obtain an updated first detection model corresponding to the first sample image

S406

Determine whether the updated first detection model converges

No

Yes    S408

Take the updated first detection model as a target detection model

FIG. 4

Mammographic
scan film

Unsupervised
candidate box
generation algorithm

Target image
region
dynamic
update

Lesion detector training

Target image
region

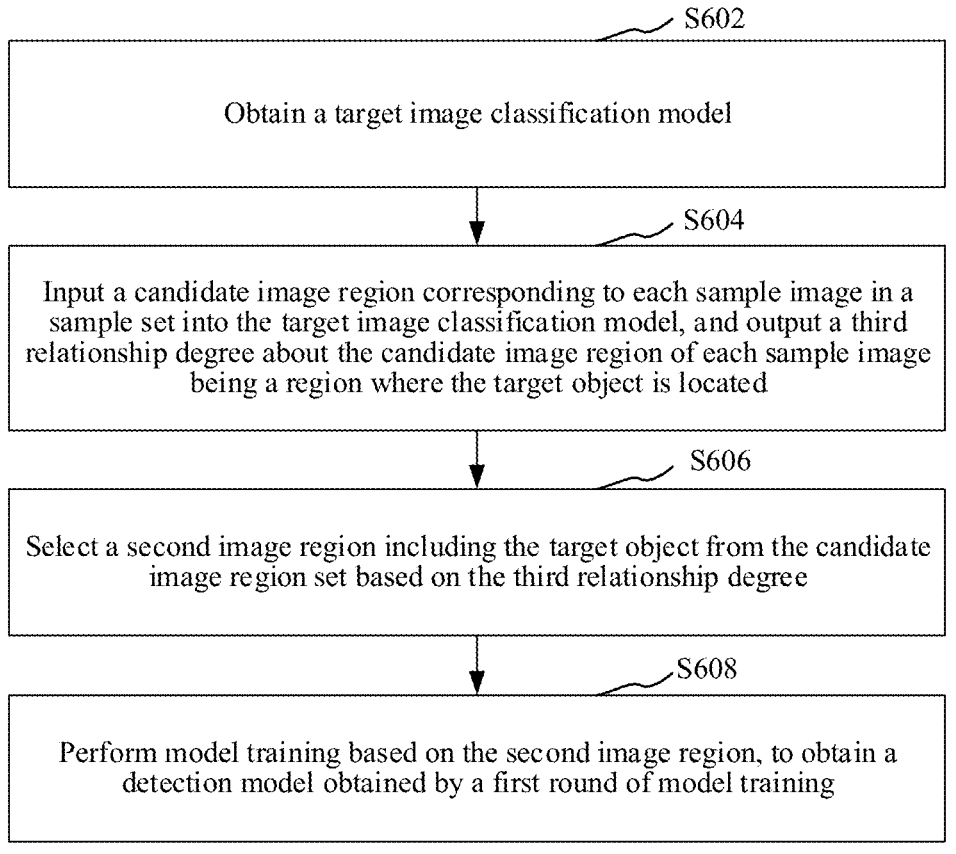

S602

Obtain a target image classification model

S604

Input a candidate image region corresponding to each sample image in a
sample set into the target image classification model, and output a third
relationship degree about the candidate image region of each sample image
being a region where the target object is located

S606

Select a second image region including the target object from the candidate
image region set based on the third relationship degree

S608

Perform model training based on the second image region, to obtain a
detection model obtained by a first round of model training

FIG. 6

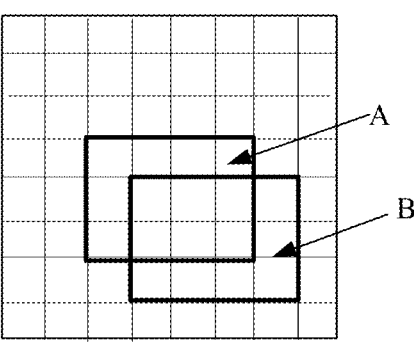

Obtain a to-be-detected image, and segment the to-be-detected image into a plurality of first image regions

S904

Input each first image region into a target detection model to obtain a target relationship degree about inclusion of the target object in each first image region

S906

Select an image region including the target object from the first image regions based on the target relationship degree, to obtain a position of the target object in the to-be-detected image

FIG. 9

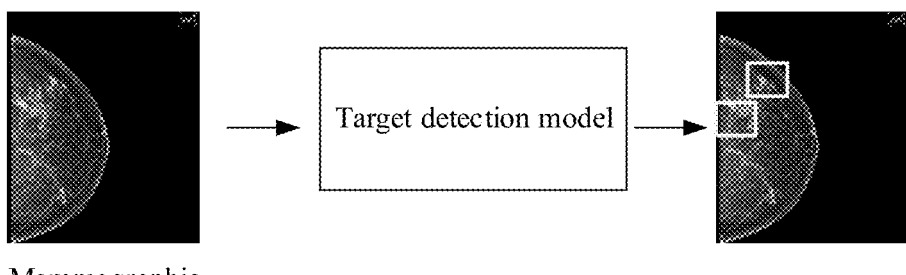

Mammographic
scan film

Target detection model

FIG. 10

DETECTION MODEL TRAINING METHOD AND APPARATUS, COMPUTER DEVICE AND STORAGE MEDIUM

CROSS-REFERENCE TO RELATED APPLICATIONS

This application is a continuation application of U.S. patent application Ser. No. 17/458,110, entitled "DETECTION MODEL TRAINING METHOD AND APPARATUS, COMPUTER DEVICE, AND STORAGE MEDIUM" filed on Aug. 26, 2021, which is a continuation application of PCT Patent Application No. PCT/CN2020/095854, entitled "DETECTION MODEL TRAINING METHOD AND APPARATUS, COMPUTER DEVICE, AND STORAGE MEDIUM" filed on Jun. 12, 2020, which claims priority to Chinese Patent Application No. 201910528002.0, filed with the State Intellectual Property Office of the People's Republic of China on Jun. 18, 2019, and entitled "DETECTION MODEL TRAINING METHOD AND APPARATUS, COMPUTER DEVICE AND STORAGE MEDIUM", all of which are incorporated herein by reference in their entirety.

FIELD OF THE TECHNOLOGY

Embodiments of this application relate to the field of image recognition, and in particular, to a detection model training method and apparatus, a computer device, and a storage medium.

BACKGROUND OF THE DISCLOSURE

Image recognition technology refers to a technology for recognizing an object included in an image, and is a common way of image processing. In related technologies, whether an image includes a to-be-recognized object is detected through a machine learning model. In some embodiments, when model training is performed on the machine learning model, an image including a target object can be obtained for model training, so that the machine learning model learns model parameters for recognizing the image including the target object. However, the image including the target object is generally relatively large, and the target object is relatively small, resulting in low detection accuracy of the learned model object.

SUMMARY

According to various embodiments provided in this application, provided are a detection model training method and apparatus, a computer device, and a storage medium.

In accordance with some embodiments, a detection model training method is performed by a computer device. The method comprises: segmenting a first sample image to obtain a candidate image region set, the candidate image region set including a plurality of candidate image regions. The method also comprises for each of the plurality of candidate image regions: (1) obtaining a first relationship degree corresponding to the candidate image region, the first relationship degree being a relationship degree about inclusion of a target object in the candidate image region, wherein the first relationship degree is generated and outputted by a first detection model using the candidate image region as input, and the first detection model is obtained by model training based on the first sample image; (2) obtaining a second relationship degree corresponding to the candidate image region, the second relationship degree being a relationship degree about inclusion of the target object in the candidate image region, wherein the second relationship degree is generated and outputted by inputting by a second detection model using the candidate image region as input, and the second detection model is obtained by model training of the first detection model using a second sample image; and (3) obtaining a relationship degree change value based on the first relationship degree and the second relationship degree. The method also comprises selecting, from the plurality of candidate image regions, a first candidate image region as a target image region based on the relationship degree change value; and performing model training based on the target image region to obtain a target detection model, the target detection model being configured to perform object detection on a to-be-detected image.

In accordance with some embodiments, a detection model training apparatus, including: a candidate image region set obtaining module, configured to obtain a candidate image region set obtained by segmenting a first sample image, the candidate image region set including a plurality of candidate image regions; a first relationship degree obtaining module, configured to obtain a first relationship degree corresponding to each candidate image region, the first relationship degree being a relationship degree about inclusion of a target object in the candidate image region that is outputted by inputting the candidate image region into a first detection model, and the first detection model being obtained by model training based on the first sample image; a second relationship degree obtaining module, configured to obtain a second relationship degree corresponding to each candidate image region, the second relationship degree being a relationship degree about inclusion of the target object in the candidate image region that is outputted by inputting the candidate image region into a second detection model, and the second detection model being obtained by model training of the first detection model using a second sample image; a target image region selecting module, configured to obtain a relationship degree change value based on the first relationship degree and the second relationship degree, and select a target image region including the target object from the candidate image region set based on the relationship degree change value; and a first model training module, configured to perform model training based on the target image region to obtain a target detection model, the target detection model being configured to perform object detection on a to-be-detected image.

In accordance with some embodiments, a computer device, comprises memory and one or more processors, the memory having computer-readable instructions stored thereon, and the computer-readable instructions, when executed by the one or more processors, cause the processor to perform any of the methods disclosed herein.

In accordance with some embodiments, a non-transitory computer-readable storage medium includes instructions stored thereon, the instructions, when executed by one or more processors, cause the one or more processors to perform any of the methods disclosed herein.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions in the embodiments of this application more clearly, the accompanying drawings required for describing the embodiments are briefly described hereinafter. Apparently, the accompanying drawings in the following description show merely some embodiments of this application, and a person of ordinary skill in the art may obtain other accompanying drawings from the accompanying drawings without creative efforts.

FIG. 2 is a flowchart of a detection model training method according to some embodiments.

FIG. 4 is a flowchart of a detection model training method according to some embodiments.

FIG. 6 is a flowchart of a detection model training method according to some embodiments.

FIG. 8 is a schematic diagram of positions of a target image region and a candidate image region in a sample image according to some embodiments.

FIG. 9 is a flowchart of a detection model training method according to some embodiments.

FIG. 10 is a schematic diagram of an object detection result outputted by inputting a to-be-detected image into a target detection model according to some embodiments.

DESCRIPTION OF EMBODIMENTS

Figure 1:
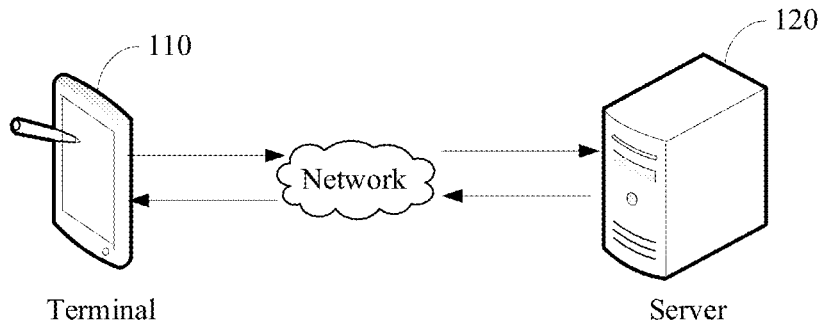
FIG. 1 is an application environment diagram of a detection model training method according to some embodiments.

To make the objectives, technical solutions, and advantages of this application clearer, the following further describes this application in detail with reference to the accompanying drawings and the embodiments. It is to be understood that the specific embodiments described herein are merely used for explaining this application but are not intended to limit this application.

It may be understood that the terms "first", "second" and the like used in this application may be used for describing various elements in this specification. However, the elements are not limited by the terms unless otherwise specified. The terms are merely used for distinguishing a first element from another element. For example, without departing from the scope of this application, a first image region may be referred to as a second image region, and similarly, the second image region may be referred to as the first image region.

The detection model in the embodiments of this application may be an artificial intelligence model, which can be used for performing target detection on an image after learning by a machine learning algorithm. Artificial intelligence (AI) is a theory, method, technology, and application system that uses a digital computer or a machine controlled by a digital computer to simulate, extend, and expand human intelligence, perceive the environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as computer vision (CV) technology, a speech processing technology, a natural language processing technology, and machine learning/deep learning.

CV is a science that studies how to use a machine to "see". To be more specific, CV performs recognition, tracking, and measurement on a target using a camera and a computer instead of human eyes, and further performs graphics processing, so that the computer processes the target into an image suitable for human eyes to observe, or an image suitable for being transmitted to an instrument for detection. As a scientific discipline, CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

Machine Learning (ML) is an interdisciplinary, and relates to a plurality of disciplines such as the probability theory, statistics, the approximation theory, convex analysis, and the algorithm complexity theory. The ML specializes in studying how a computer simulates or implements a human learning behavior to obtain new knowledge or skills, and reorganize an existing knowledge structure, so as to keep improving its performance. The ML is the core of the AI, is a basic way to make the computer intelligent, and is applied to various fields of AI. ML and deep learning generally include technologies such as an artificial neural network, a belief network, reinforcement learning, transfer learning, inductive learning, and learning from demonstrations.

FIG. 1 is an application environment diagram of a detection model training method according to some embodiments. As shown in FIG. 1, in the application environment, a terminal 110 and a server 120 are included. The terminal 110 can capture an image through a camera and send the image to the server 120. The server 120 stores a target detection model obtained by model training according to the method provided in the embodiments of this application, and the server 120 can perform object detection on the captured image using the target detection model, to obtain the specific position of the target object included in the image. The server 120 returns the image with the position of the target object annotated to the terminal 110, and the terminal 110 can display the image with the position of the target object annotated.

In some embodiments, the target detection model may also be stored in the terminal 110, and the terminal 110 executes the step of detecting the position of the target object in the image using the target detection model.

The server 120 may be an independent physical server, or may be a server cluster constituted by a plurality of physical servers, or may be a cloud server providing basic cloud computing services, such as a cloud server, a cloud database, cloud storage and a CDN. The terminal 110 may be a smart phone, a tablet computer, a notebook computer, a desktop computer, a smart speaker, a smart watch, a medical device such as an X-ray device, etc., but it is not limited thereto. The terminal 110 and the server 120 can be connected in a communication connection mode such as a network, which is not limited in this application.

As shown in FIG. 2, in some embodiments, a detection model training method is provided. This embodiment mainly applies the method to the server 120 in FIG. 1 as an example. The method may specifically include the following steps:

Step S202: Obtain a candidate image region set obtained by segmenting a first sample image, the candidate image region set including a plurality of candidate image regions.

Figure 3:
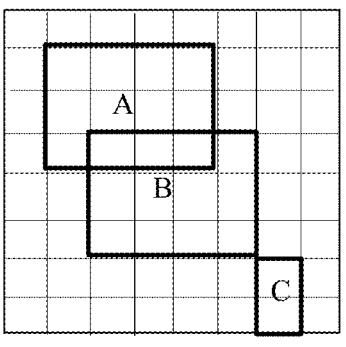
FIG. 3 is a schematic diagram of obtaining candidate image regions by segmenting a sample image according to some embodiments.

Specifically, the sample image is an image used for model training. The sample image contains a target object. The target object refers to an object that needs to be detected. The target object may be different according to specific application scenarios. For example, the target object may be at least one of an animal, a plant, or an object. Specifically, the target object may be a lump, an automobile, or a pedestrian, etc. "A plurality of" refers to at least two. The candidate image regions are image regions obtained by segmenting the sample image, and the number of candidate image regions in the candidate image region set can be set as required, for example, it can be 3,000, that is, an image can be segmented to obtain 3,000 image regions. The candidate image regions are smaller than the first sample image in size, and the candidate image regions in the candidate image region set may or may not have overlapping regions. The sizes of the candidate image regions may be the same or different. For example, FIG. 3 is a schematic diagram of candidate image regions obtained by segmenting the sample image. The sample image may include three candidate regions: A, B, and C. There is an overlapping region between A and B, the sizes of A and B are the same, and the image size of C is smaller than the image sizes of A and B.

In some embodiments, a segmentation method for the candidate image regions can be set as required. For example, the sample image can be segmented into a plurality of image regions based on region similarity according to an unsupervised algorithm. The method for unsupervised obtaining of candidate regions does not require annotation, and regions with a high probability of containing the target object can be extracted based on underlying visual features of the image. The high probability may be higher than a preset probability, such as 0.8. For example, a region of lesions including a nodule or a mass of abnormal tissue is extracted. The unsupervised candidate region generation method can obtain thousands of candidate regions containing objects. Unsupervised segmentation algorithms may include a fragment grouping method and a window scoring method. According to the fragment grouping method, the image can be divided into ultrapixel blocks, and a plurality of candidate regions that may include the object can be generated through the grouping method. For example, the multiscale combinatorial grouping (MCG) or selective search algorithm can be adopted to obtain a plurality of candidate image regions. The window scoring method can be, for example, an EdgeBox algorithm. The EdgeBox algorithm is a method for target detection through edge feature extraction. The algorithm can indicate the probability of including the target object by the number of complete outlines contained in a bounding box, on this basis, the bounding box is scored, and a region corresponding to the bounding box with a score greater than a certain threshold is retained as a candidate region.

In some embodiments, the sample image is a mammographic image, and the mammographic image refers to a black-and-white image captured by medical equipment (such as X-ray equipment). The target object may be a lump, such as a breast cancer lump. The purpose of model training is to accurately detect the position of the target object in the image through the finally obtained target detection model.

Step S204: For each of the plurality of candidate image regions, obtain a first relationship degree corresponding to the respective candidate image region, the first relationship degree being a relationship degree about inclusion of a target object in the candidate image region that is outputted by inputting the candidate image region into a first detection model, and the first detection model being obtained by model training based on the first sample image.

Specifically, the relationship degree indicates a possibility that the candidate image region is the image region where the target object is located, that is, the possibility that the candidate image region includes the target object. The relationship degree may be indicated by the probability. The greater the relationship degree corresponding to an image region is, the greater the possibility that the image region is the image region where the target object is located is. The detection model is an AI model configured to calculate the relationship degree that the candidate image region is the image region where the target object is located, and can output at least one of the position of the target object in the image or the probability of including the target object in the image. The position of the target object may be indicated by the center coordinates, height, and width of the target object, and a position region can be determined by the center coordinates, height, and width, and the position region is the position of the target object. The first detection model is obtained by model training based on the first sample image, and there may be one or more first sample images. For example, assuming that the first sample image is a, the first detection model is obtained by model training based on a. During model training based on the first sample image, the entire sample image can be taken as the image containing the target object, or the sample image can be segmented into a plurality of candidate image regions, and a region of high possibility being the image region where the target object is located is selected from the plurality of candidate image regions. For example, model training is performed on a region with a relationship degree greater than a preset relationship degree, to obtain the first detection model.

During the model training, a supervised training method can be adopted to input the image into the model, and the position of the target object in the image is obtained by model prediction. A loss value is obtained according to a difference between the actual position of the target object in the image and the predicted position. The greater the difference is, the greater the loss value is. A gradient descent method can be adopted to adjust the model parameters in a direction in which the loss value becomes smaller. In calculation of the loss value, a first loss value can be obtained according to a difference between center coordinates of the predicted position of the target object and the center coordinates of the actual target object, a second loss value can be obtained according to the predicted relationship degree and the actual relationship degree, and a total loss value can be obtained according to the first loss value and the second loss value. It is also possible to combine the loss value calculated based on the difference between the predicted width and the actual width, and the loss value calculated based on the difference between the predicted height and the actual height to obtain the total loss value.

Step S206: For each of the plurality of candidate image regions, obtain a second relationship degree corresponding to the respective candidate image region, the second relationship degree being a relationship degree about inclusion of the target object in the candidate image region that is outputted by inputting the candidate image region into a second detection model, and the second detection model being obtained by model training of the first detection model using a second sample image.

Specifically, the first sample image and the second sample image are different sample images. The second detection model may be obtained by model training based on the first detection model, that is, after the first detection model is obtained by model training, the model training is continued using the second sample image. There may be a plurality of second sample images. During the model training based on the second sample image, the entire second sample image can be taken as the image containing the target object, or the sample image can be segmented into a plurality of candidate image regions, and a region of high possibility being the image region where the target object is located is selected from the plurality of candidate image regions. For example, a region with the relationship degree being greater than the preset relationship degree continues to perform model training on the first detection model to obtain a second detection model.

Step S208: For each of the plurality of candidate image regions, obtain a relationship degree change value based on the first relationship degree and the second relationship degree, and select a target image region including the target object from the candidate image region set based on the relationship degree change value.

Specifically, the relationship degree change value indicates the magnitude of change from the first relationship degree to the second relationship degree, and the relationship degree change value may be indicated by a ratio or a difference. A candidate image region that satisfies a preset relationship degree change condition can be selected from the candidate image region set based on the relationship degree change value, as the target image region including the target object, for example, the candidate image region with the largest relationship degree change value in the sample image is taken as the target image region.

In some embodiments, the relationship degree change value can be obtained by subtracting the first relationship degree from the second relationship degree or dividing the second relationship degree by the first relationship degree. For example, assuming that the first relationship degree is 0.6 and the second relationship degree is 0.92, the relationship degree change value is 0.92-0.6=0.32.

In some embodiments, a candidate image region of the plurality of candidate image regions with the relationship degree change value satisfying a preset change condition can be selected from the candidate image region set as the target image region including the target object, the preset change condition including at least one of a condition that a relationship degree rank is ahead of a preset rank or a condition that the relationship degree change value is greater than a preset change value, and relationship degree change values being sorted in descending order.

Specifically, the preset rank can be set as required, for example, 2. The preset change value can also be set to any positive number as required, for example, it can be 0.4. The relationship degree change values are sorted in descending order. The larger the change value is, the higher the rank is. For example, assuming that there are four candidate image regions, the corresponding relationship degree change values are 0.43, 0.32, 0.41, and 0.02 respectively, thus the candidate image region corresponding to 0.43 is ranked first, the candidate image region corresponding to 0.41 is ranked second, the candidate image region corresponding to 0.32 is ranked third, and the candidate image region corresponding to 0.02 is ranked fourth.

In some embodiments, image regions that do not include the target object can be selected from the candidate image region set based on the relationship degree change value. For example, the relationship degree change value may be ranked behind the second preset rank, or the candidate image region with the relationship degree change value being less than a second preset change value is taken as an image region that does not include the target object. The second preset change value may be a negative number, and this type of image regions are taken as the image regions corresponding to the negative sample for model training.

Step S210: Perform model training based on the target image region to obtain a target detection model, the target detection model being configured to perform object detection on a to-be-detected image.

Specifically, after the target image region is obtained, the target image region is taken as a region including the target object, that is, as a positive sample, and model training is performed using the target image region, to obtain a target detection model. The detection model obtained by training based on the target image region can be taken as the target model, or after the model training is performed using the target image region, the training is continued using other sample images, to obtain the target detection model. The target detection model is a trained model, and can be configured to perform object detection on the to-be-detected image, that is, a to-be-tested image. For example, the target detection model can be configured to detect the position of the object in the image, and can also be configured to detect whether the target object is included in the image.

In some embodiments, the second detection model may be trained according to the target image region to obtain the target detection model, that is, on the basis of the model parameters of the second detection model, the model parameters continue to be adjusted to obtain the target detection model.

In some embodiments, an image region with a high overlapping degree to the target image region, for example, an image region greater than a preset overlapping degree, may also be obtained as an image region including the target object. Since the position of the target object may involve a plurality of candidate image regions, due to errors of the first detection model and the second detection model, missing detection may occur. Therefore, through the overlapping degree, image regions around the target image region can also be taken as image regions including the target object.

In the foregoing detection model training method, the first detection model is obtained by model training based on the first sample image, and has high recognition capacity to the first sample image, and the second detection model obtained by continuing training based on the second sample image enhances the generalization performance of the model, that is, enhances the model's adaptive capacity to the sample. Therefore, the change in the relationship degree of the candidate image region can reflect whether the image region includes the target object. As a result, the accuracy of obtaining the region including the target object based on the relationship degree change value is high. Therefore, it is possible to find an image region including the target object from the first sample image as a sample for model training, and the target detection model obtained by training has high accuracy.

In some embodiments, whether the candidate image region is a region including the target object is determined using the detection model, the determinant factors of the relationship degree of the candidate image region outputted by the model mainly come from two aspects. The first aspect is whether the sample image is taken as a positive sample to train the detection model, and if yes, the candidate image region is evaluated using the first detection model obtained by the model training due to overfitting, and the outputted relationship may be relatively high. The second aspect is that the classification capacity of the detection model is enhanced after the detection model continues to be trained with other sample images. Therefore, if the classification capacity of the second detection model is enhanced after the first detection model continues to be trained with other sample images, a scoring value of the candidate image region including the target object (i.e., the outputted relationship degree) is also improved. Therefore, if the second relationship degree of the candidate image region outputted by the second detection model obtained by training with other sample images (a second sample image) is high, the relationship degree change value corresponding to the candidate image region is larger than those of other candidate image regions in the same sample image, indicating that the possibility that the candidate image region is a region including the target object is relatively high. Due to the relationship degree after the last training, a sample is not taken as the sample including the target object for training the object detection model again until the time before this training, so it can be explained that the high relationship degree change value comes from the reasons of the second aspect, that is, the classification capacity of the object detection model is enhanced in the process of training other samples, and the sample includes the target object. Therefore, the relationship degree change value between the two trainings can reasonably reflect whether a candidate image region includes the target object. Therefore, a candidate image region with a large relationship degree change in the first sample image may be taken as the image region including the target object.

However, if the candidate image region does not include the target object, even if the candidate image region is taken as the region including the target object for model training, after continuing training using other sample images, the relationship degree is predicted using the second detection model. Due to the enhancement of the classification capacity of the detection model, the relationship degree of the candidate image region is still very low, indicating that it is not the image region including the target object. Therefore, the method according to the embodiments of this application can improve the accuracy of obtaining the image region including the target object.

In some embodiments, as shown in FIG. 4, before obtaining a candidate image region set obtained by segmenting a first sample image, the method further includes step S402: obtaining a sample image set, and obtaining an updated first sample image and an updated second sample image by division based on the sample image set, the sample image set including a plurality of sample images.

Specifically, the number of images in the sample image set can be set as required, for example, 1,000. During the model training, model training is performed using a sample image set, to obtain a target detection model. In the sample image set, the first sample image and the second sample image are continuously updated as the model training progresses. For example, a sample image is taken as the first sample image at a certain moment, and as the second sample image at another moment. For example, one or more images in the sample image set are sequentially taken as the first sample image, and sample images other than the first sample image are taken as the second sample image. For a practical example, assuming that there are 1,000 sample images in the sample set, a first sample image is taken as the first sample image in the first model training, and a second sample image is taken as the first sample image during the model training using the first sample image, . . . , and so on, and a $1000^{th}$ sample image is taken as the first sample image after using a $999^{th}$ sample image for model training.

As shown in FIG. 4, step S210 of performing model training based on the target image region to obtain a target detection model may include the following steps:

Step S404: Perform model training on the second detection model based on the target image region to obtain an updated first detection model corresponding to the first sample image.

Specifically, model training is performed on the second detection model based on the target image region, the trained model is taken as a model obtained by training based on the first sample image, that is, the trained model is updated as a first detection model corresponding to the first sample image.

Step S406: Determine whether the updated first detection model converges.

Specifically, the model convergence may include at least one of the following conditions: a loss value of the model is smaller than a first threshold, a change value of the loss value of the model is smaller than a first change value, or a change in parameters of the model is smaller than a second change value. If the first detection model converges, step S408 is performed, i.e., the updated first detection model is taken as the target detection model. If the first detection model does not converge, step S402 is performed, that is, the step of obtaining an updated first sample image and an updated second sample image by division based on the sample image set is performed. A next sample image or a next group of sample images in the sample set is taken as the first sample image. The target detection model is obtained until the updated first detection model converges.

It can be understood that the updated first detection model corresponding to the first sample image in step S404 refers to updating the first detection model obtained by training the same first sample image. After returning to step S402, since the first sample image changes, the first detection model obtained by training based on the first sample image also changes. For example, assuming that the first sample image is "a", the updated first detection model is a detection model obtained by training based on "a". Assuming that after returning to step S402, the updated first sample image is "b", then the obtained first detection model is a detection model obtained by training based on "b". When "a" is taken as the first sample image next time, the updated first detection model corresponding to "a" is obtained.

Step S408: Take the updated first detection model as a target detection model.

In the embodiments of this application, model training is performed based on a plurality of samples in the sample set, and the first sample image in the sample set is updated. Therefore, the model can be trained multiple times to improve the accuracy of the model.

Figure 5A:
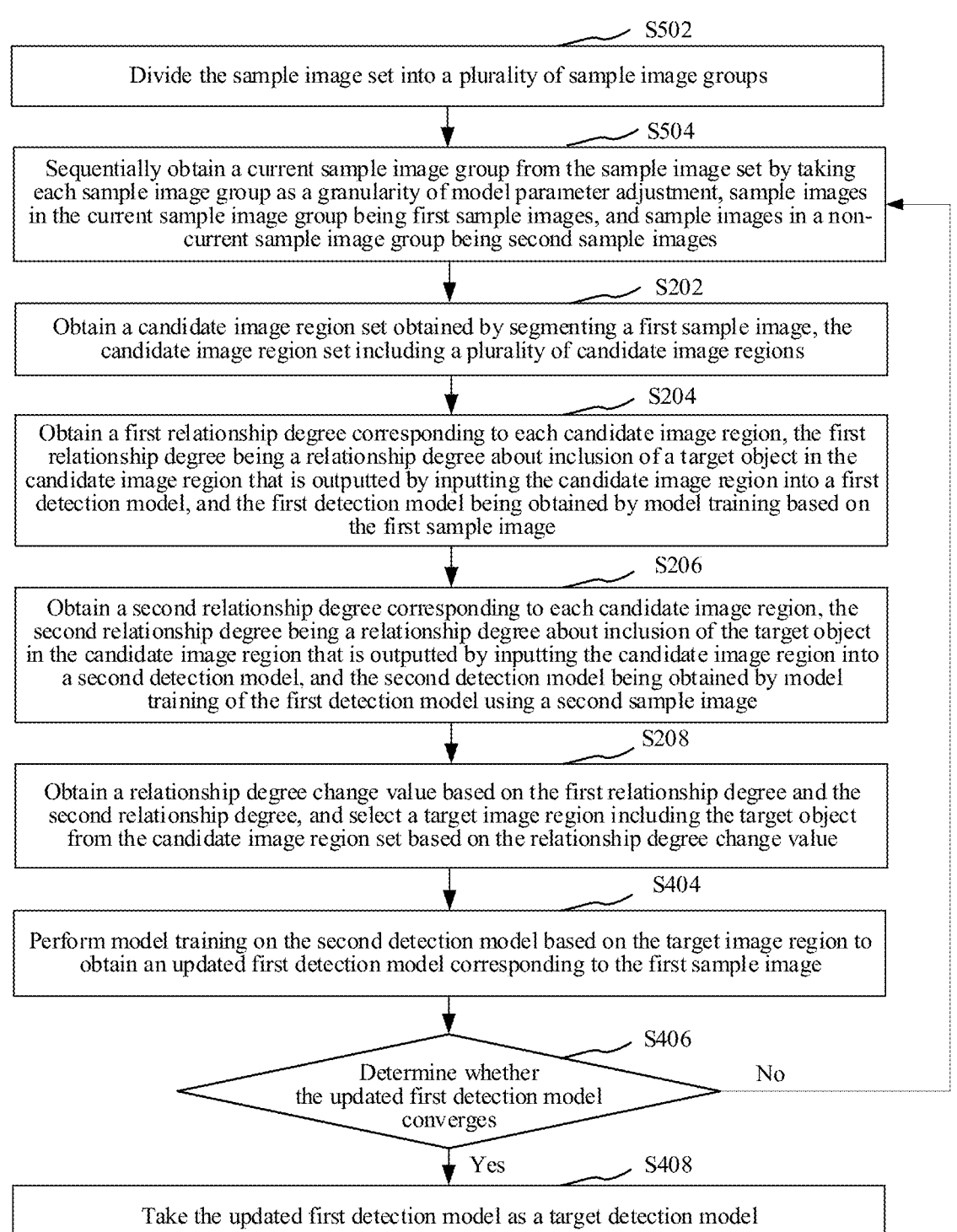
FIG. 5A is a flowchart of a detection model training method according to some embodiments.

In some embodiments, as shown in FIG. 5A, step S402 of obtaining an updated first sample image and an updated second sample image by division based on the sample image set includes the following steps:

Step S502: Divide the sample image set into a plurality of sample image groups.

Specifically, a sample image group may include a plurality of sample images. The number of sample image groups can be set as required, for example, 100. For example, assuming that there are 1,000 sample images in the sample image set, that is, every 10 sample images form a group, and the 1,000 sample images are divided into 100 groups.

Step S504: Sequentially obtain a current sample image group from the sample image set by taking each sample image group as a granularity of model parameter adjustment, sample images in the current sample image group being first sample images, and sample images in a non-current sample image group being second sample images.

Specifically, taking each sample image group as a granularity of model parameter adjustment refers to using one group as the training granularity to adjust the model parameters once. That is, each group performs gradient update of the parameters by group. In calculation of the loss value of the model, a mean value of the loss values of the first sample images in the current sample image group can be calculated. The non-current sample image group refers to a group that is not the current sample image group. Sequentially obtaining a current sample image group from the sample image set refers to: obtaining the current sample image group from the sample image set in sequence. For example, assuming there are 10 sample image groups, in the first model training, the first sample image group is taken as the current sample image group, and in the second model training, the second sample image group is taken as the current sample image group. Therefore, in obtaining of the first sample images, the first sample images are obtained by group, and the model parameters are adjusted once for each group, so that the adjustment of the model parameters can be more accurate.

In some embodiments, as shown in FIG. 5A, when the first model does not converge, the step of sequentially obtaining a current sample image group from the sample image set by taking each sample image group as a granularity of model parameter adjustment, sample images in the current sample image group being first sample images, and sample images in a non-current sample image group being second sample images is performed.

In some embodiments, multiple rounds of model training may be performed. The obtaining a first relationship degree corresponding to each candidate image region includes: taking a model obtained by model training using the same sample image group in the previous round of model training as the updated first detection model, and obtaining, based on the updated first detection model, the first relationship degree corresponding to each candidate image region. The obtaining a second relationship degree corresponding to each candidate image region includes: taking a model obtained by model training using a forward sample image group of the current sample image group in a current round of model training as the updated second detection model, and obtaining, based on the updated second detection model, the second relationship degree corresponding to each candidate image region.

Specifically, a round of training means that all the sample image groups in the sample set are used as samples to train the detection model. For example, assuming that the sample set has 1,000 sample images, divided into 100 groups, the 100 sample image groups are sequentially taken as the current sample image group, and the model training is performed, which is a round of model training. This round refers to the current round of model training, and the previous round refers to the previous round of this round. When the current sample image group is used for model training in this round, a model updated after training using the same sample image in the previous round of model training is obtained as the first detection model corresponding to the current sample image group, namely, as the first detection model corresponding to each first sample image in the current sample image group. For each first sample image in the current sample image group, a corresponding candidate image region is obtained and inputted into the first detection model, and the first detection model outputs a first relationship degree about inclusion of the target object in the candidate image region.

The forward sample image group refers to the sample image group that is taken as the first sample image to train the detection model before the current sample image group during this round of model training. For the current sample image group, the second detection model is a model obtained by model training using the forward sample image group. For each first sample image in the current sample image group, a corresponding candidate image region is obtained and inputted into the second detection model, and the second detection model outputs a second relationship degree about the inclusion of the target object in the candidate image region. Therefore, for the same candidate image region, a relationship degree change value can be obtained based on the first relationship degree and the second relationship degree. For each first sample image, the target image region including the target object can be selected from the candidate image region set based on the relationship degree change value.

In some embodiments, if the current sample image group is a first sample image group in this round of training, a detection model obtained in the previous round of training may be taken as the updated second detection model.

A formula for obtaining the target image region can be expressed by Formula (1). For any sample image, a positive sample in the $(t+1)^{th}$ round, that is, the image region including the target image includes a candidate image region of the largest relationship degree change value obtained by subtracting the first relationship degree from the second relationship degree. The first relationship degree is outputted by processing the candidate image region using a first detection model obtained after the $t^{th}$ round of training is performed on the sample image group where the sample image is located. The second relationship degree is outputted by processing the candidate image region using a second detection model obtained after the $(t+1)^{th}$ round of training is performed on the previous sample image group of the sample image.

$$B_i^{t+1}$$

is the second relationship degree corresponding to the $i^{th}$ candidate image region outputted by the second detection model in the $(t+1)^{th}$ round.

$$A_1^t$$

is the first relationship degree corresponding to the $i^{th}$ candidate image region outputted by the first detection model.

$$P_{t+1}^{*}$$

is the target image region selected in the sample image in the $(t+1)^{th}$ round, and argmax represents a maximum value.

$$P_{t+1}^{*} = \underset{i}{\mathrm{argmax}}\left(B_{i}^{t+1} - A_{i}^{t}\right) \qquad (1)$$

The object detection model training method provided by the embodiments of this application uses a model obtained by updating and training using the same sample image group in the previous round of model training as the first detection model, and a model obtained by model training using a forward sample image group of the current sample image group in the current round of model training as the updated second detection model. The candidate image region is selected as the target image region based on the change in the relationship degrees outputted by the two models. Therefore, in different rounds of model training, for the same sample image, the image region including the target object is dynamically updated, that is, the positive sample is dynamically updated with the training of the model. Because the accuracy of the model is constantly improving with the training of the model, the accuracy of obtaining positive samples is also continuously improving, so the sample quality and the model detection capacity can be improved together.

Figure 5B:
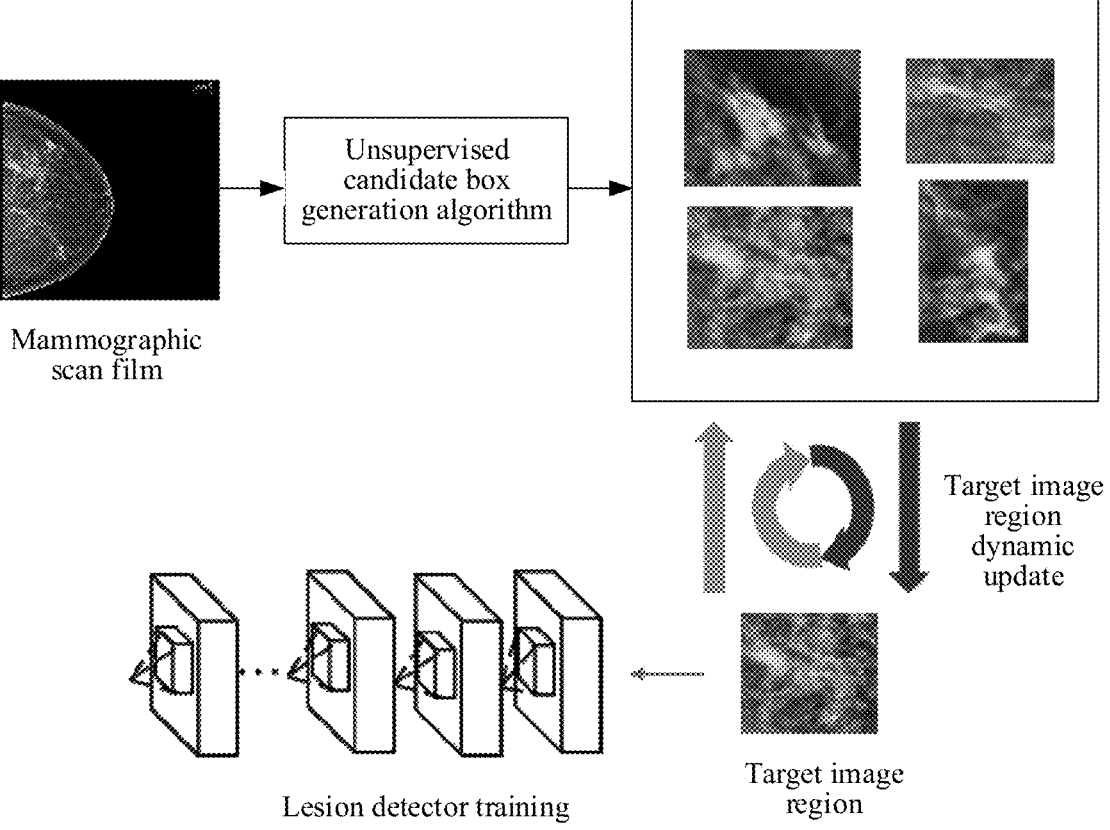
FIG. 5B is a schematic diagram of model training of an object detection model according to some embodiments.

For example, taking the obtained sample image being an image including breast cancer as an example, as shown in FIG. 5B, after a mammographic scan film is obtained, a plurality of candidate boxes can be generated based on the unsupervised candidate box generation technology. The region enclosed by the candidate box is a candidate image region. In each round of training, a target image region of a sample image can be continuously updated. The updated target image region is obtained to train a lesion detector (i.e., the object detection model), to obtain the target detection model. For example, for a sample image a, in the first round, a second image region is the target image region, and in the second round, a third image region is the target image region.

In some embodiments, as shown in FIG. 6, the target detection model training method may further include the following steps:

Step S602: Obtain a target image classification model.

Specifically, the image classification model is a model configured to distinguish whether the image includes the target object. When the image is inputted to the object classification model, the object classification model outputs a result of whether the image includes the target object, e.g., including the relationship degree of the target object. The target image classification model may be a binary classification network model. The object detection model can be configured to detect the position of the target object in the image, and can also be configured to detect whether the image includes the target object, that is, to classify the image. The object classification image may be a model obtained by training based on the complete sample image in the sample set. A deep convolutional neural network recognizing whether the image includes the target object is trained using an image with an image level annotation (i.e., annotating whether the sample image contains the target object) as the training sample. Since a classification model is obtained by training, the sample images in the sample set may not be segmented, and the classification model can also be obtained by training based on the complete sample image.

The network structure of the object classification model may be any image classification network structure, such as Residual Neural Network (ResNet), AlexNet, or GoogleNet. GoogLeNet is a deep learning network model launched by Google. The target detection model may be any target detection network, such as Faster Regions with Convolutional Neural Network (RCNN), You Only Look Once (YOLO) or Region-based Fully Convolutional Network (RFCN). YOLO is an object detection algorithm that can treat the object detection problem as a regression problem, predict the inputted image through the convolutional neural network structure, and predict the image region and category probability of the target object.

Step S604: Input the candidate image region corresponding to each sample image in the sample set into the target image classification model, and output a third relationship degree about the candidate image region of each sample image being a region where the target object is located.

Specifically, the candidate image regions are processed through the model parameters of the object classification model, and the relationship degree about inclusion of the target object in each candidate image region is outputted as the third relationship degree.

Step S606: Select a second image region including the target object from the candidate image region set based on the third relationship degree.

Specifically, an image region with a third relationship degree being greater than a relationship degree threshold or a relationship degree rank being ahead of a preset rank may be obtained from the candidate image region based on the third relationship degree as the second image region including the target object. The relationship degree threshold is set as required, and the preset rank may be, for example, 2. The relationship degrees are ranked in descending order. For example, for each sample image, a candidate image region with the largest third relationship degree may be used as the second image region.

Step S608: Perform model training based on the second image region, to obtain a detection model obtained by a first round of model training.

Specifically, in the first round of model training, the current sample image group may be sequentially obtained from the sample image set by taking the sample image group as a granularity of model parameter adjustment for model training. Therefore, the first detection model corresponding to each sample image group can be obtained in the first round of training. In the second round of model training, a model obtained by training using the same sample image group can be taken as the first detection model. Since in the first round of model training, there is no model obtained from the previous round of training, a target image region cannot be obtained based on a relationship degree change value, so the candidate image region can be scored using a pre-trained object classification model (that is, outputting the relationship degree), an image region of high relationship degree is selected based on the outputted relationship degree as the image region including the target object. The second image region is obtained as a region including the target object. Model training is performed using the second image region, and the detection model obtained in the first round of model training is obtained. Therefore, according to the object detection model training method provided by the embodiments of this application, model training can be performed in the sample image, when the target object is included is annotated, but the specific position of the target object is not annotated, to obtain the detection model obtained by the first round of model training, so that subsequent rounds of model training can be performed under the model obtained in the first round of training. That is, the object detection model training method provided in the embodiments of this application may be a weakly supervised model training method. During model training, even if the sample image contains image-level annotations (whether the sample image has a target object) and does not contain detailed position annotations (that is, the specific position of the target object in the sample image is not annotated), the model training can be performed, to obtain a model that can detect the specific position of the target object in the image.

Figure 7:
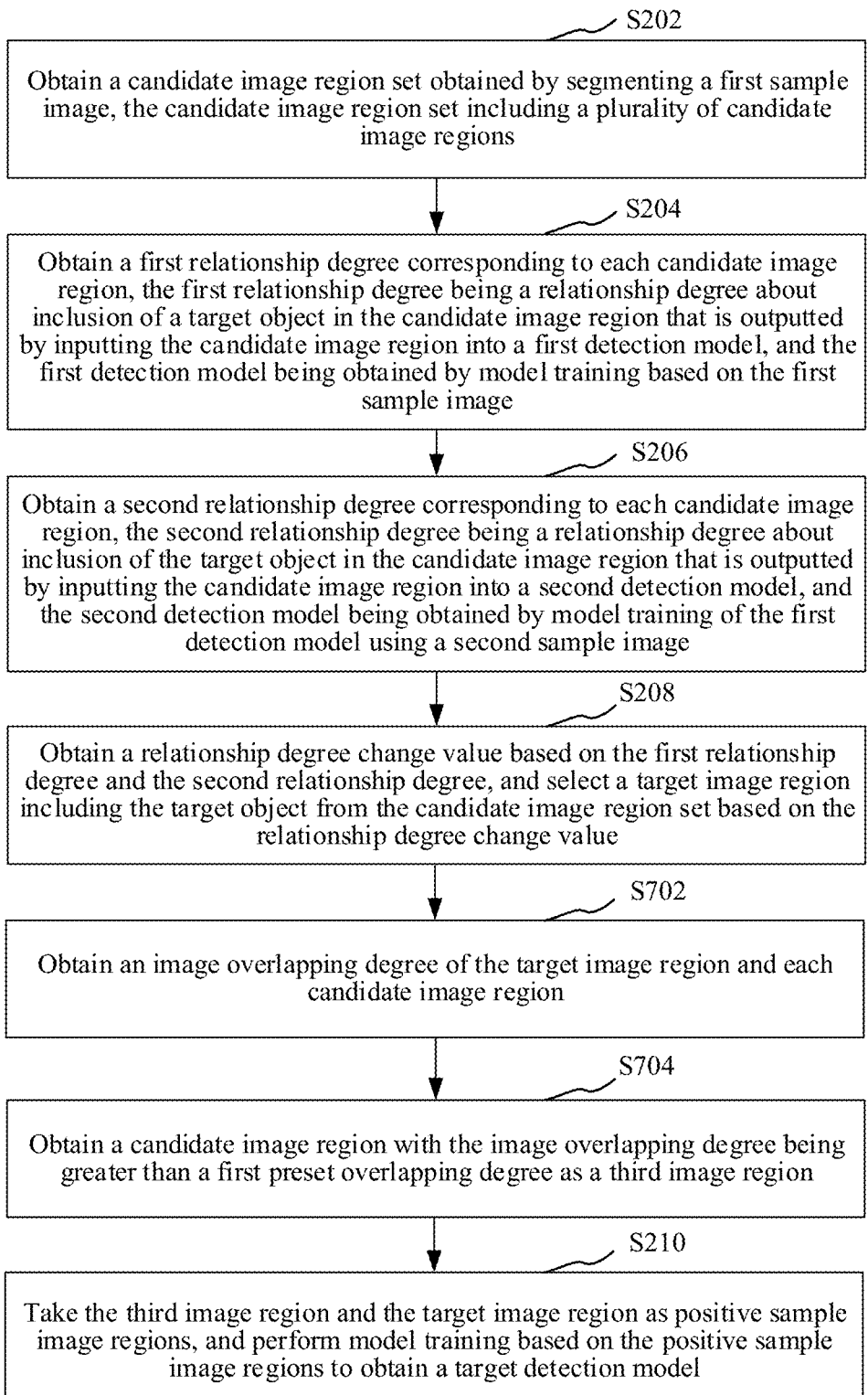
FIG. 7 is a flowchart of a detection model training method according to some embodiments.

In some embodiments, as shown in FIG. 7, the object detection model training method may further include the following steps:

Step S702: Obtain an image overlapping degree of the target image region and each candidate image region.

Specifically, the image overlapping degree is used for indicating the degree of image position coincidence. The higher the image overlapping degree is, the higher the degree of position coincidence is. The image overlapping degree of each candidate image region in the target image region and the candidate image region set can be calculated.

In some embodiments, the position overlapping degree can be obtained based on a ratio of the first area to the second area. The first area is the overlapping area of the target image region and the candidate image region in the image, i.e., the area corresponding to an intersection of the positions. The second area is an area occupied by a union of the positions of the target image region and the candidate image region in the image. The calculation method of the image overlapping degree can be expressed by Formula (2), "I" indicates the position overlapping degree, area indicates calculating an area, A refers to the current position of the target image region in the image, and B refers to the reference position of the candidate image region in the image. "∩" refers to calculating the intersection, and "∪" refers to calculating the union. FIG. 8 is a schematic diagram of the positions of the target image region and the candidate image region in the sample image in some embodiments. Box A indicates the position of the target image region in the image. Box B indicates the position of the candidate image region in the image. A grid in FIG. 8 indicates a pixel. According to FIG. 8, the overlapping part of A and B, i.e., the intersection, occupies a total of six pixels (the pixels between row 5, column 4 and row 6, column 6). The union of A and B occupies a total of 18 pixels, and the position overlapping degree is 6/18=0.33.

$$I=\text{area}(A \cap B)/\text{area}(A \cup B) \tag{2}$$

Step S704: Obtain a candidate image region with the image overlapping degree being greater than a first preset overlapping degree as a third image region.

Specifically, the preset overlapping degree can be set as required, for example, 0.5. The third image region refers to an image region including the target object.

Step S210, i.e., performing model training based on the target image region to obtain a target detection model, includes: taking the third image region and the target image region as positive sample image regions, and performing model training based on the positive sample image regions to obtain a target detection model.

Specifically, the positive sample image regions refer to the image regions including the target object. For the positive sample image regions, the corresponding relationship degrees about inclusion of the target object of the positive sample image regions, for example, probabilities, may be 1, that is, sample tag values may be 1. In some embodiments, when the image region including the target object is selected based on the relationship degree change, there may be errors in the model, and the position occupied by the target object may include a plurality of candidate image regions, so a candidate image region highly overlapping the target image region is obtained based on the overlapping degree as the image region including the target object, so as to obtain a more accurate positive sample for model training, thereby improving the accuracy of the trained model.

In some embodiments, a candidate image region with the image overlapping degree being less than a second preset overlapping degree may also be obtained as a fourth image region. The second preset overlapping degree is less than or equal to the first preset overlapping degree. Step S210, i.e., performing model training based on the target image region to obtain a target detection model, includes: taking the fourth image region as a negative sample image region, and the target image region group as a positive sample image region. Model training is performed based on the positive sample image region and the negative sample image region to obtain a target detection model.

Specifically, the second preset overlapping degree may be less than or equal to the first preset overlapping degree, for example, the second overlapping degree may be 0.5. The negative sample image region refers to the image region excluding the target object. For the negative sample image region, the corresponding relationship degree of the negative sample image region including the target object may be 0, that is, a sample tag value may be 0.

In some embodiments, the third image region and the fourth image region can be obtained simultaneously. The third image region and the target image region are taken as positive sample image regions, and the fourth image region is taken as a negative sample image region. Model training is performed based on the positive sample image regions and the negative sample image region to obtain a target detection model.

In some embodiments, object detection can also be performed on the obtained target detection model. Therefore, as shown in FIG. 9, the object detection model training method may further include the following steps:

Step S902: Obtain a to-be-detected image, and segment the to-be-detected image into a plurality of first image regions.

Specifically, the to-be-detected image is an image requiring detection of the position of the target object. The method of segmenting the target image into a plurality of first image regions can also refer to a method of segmenting the sample image into a plurality of candidate image regions, and the details are not repeated here. The image segmentation can be performed by the target detection model.

Step S904: Input each first image region into the target detection model to obtain a target relationship degree about inclusion of the target object in each first image region.

Specifically, the target detection model can process the first image regions based on the trained model parameters, and the target relationship degree about inclusion of the target object in each first image region is predicted.

Step S906: Select an image region including the target object from the first image regions based on the target relationship degree, to obtain a position of the target object in the to-be-detected image.

Specifically, after obtaining the target relationship degrees corresponding to respective first image regions, the target detection model can select an image region with the target relationship degree being greater than the preset relationship degree or the relationship degree rank being greater than the preset rank from the first image regions based on the target relationship degrees as the image region including the target object, to obtain the position of the image region including the target object in the to-be-detected image. For example, the image region including the target object can be annotated with an annotation box in the to-be-detected image, and the relationship degrees are ranked in descending order.

For example, as shown in FIG. 10, the to-be-detected image, after obtained, can be inputted into the target detection model, and the target detection model outputs the position of the target object in the to-be-detected image, and the region enclosed by the box as shown in FIG. 10 indicates the position of the target object in the to-be-detected image.

Taking training a model of detecting the position of breast cancer in an image as an example below, the method provided by the embodiments of this application is described, and includes the following steps:

1. Obtain a sample image set.

Specifically, for example, a mammographic image obtained by photographing a human breast with an X-ray medical device can be obtained, and the sample image set may contain 10,000 sample images.

2. Divide the sample image set into a plurality of sample image groups.

For example, 10 sample images can be used as a sample image group, and the sample image set is divided into 1,000 sample image groups.

3. Segment each sample image in the sample image set to obtain a candidate region set corresponding to each sample image.

For example, each mammographic image can be segmented using an MCG method, to obtain 3,000 candidate image regions corresponding to each image. That is, a mammographic image has 3,000 candidate boxes, and the position surrounded by a candidate box is a candidate image region.

4. Sequentially obtain a current sample image group from the sample image set by taking each sample image group as a granularity of model parameter adjustment.

Specifically, the current sample image group is continuously updated. For example, first, the first sample image group can be used as the current sample image group to complete model training once and update the parameters of the model. Then the second sample image group is obtained to complete a model training again, and update the parameters of the model. A round of model training is completed until the $1000^{th}$ sample image group is used as the current sample image group.

5. Obtain a candidate image region set obtained by segmenting a first sample image.

Specifically, the first sample image is a sample image in the current sample image group. Since the segmentation of the sample image is completed in step 3, a candidate image region set obtained by segmenting the first sample image can be directly obtained from the candidate image region obtained in step 3.

7. Take a model obtained by training and updating using the same sample image group in the previous round of model training as a first detection model, and obtain, based on the first detection model, the first relationship degree corresponding to each candidate image region.

Specifically, multiple rounds of model training can be performed. For example, during the second round of model training, when the current sample image group is an eighth sample image group, a model obtained by model training using the eighth sample image group during the first round of model training is obtained as the first detection model. During the third round of model training, when the current sample image group is a ninth sample image group, a model obtained by model training using the ninth sample image group during the second round of model training is obtained as the first detection model. The candidate image region corresponding to each sample image in the current sample image group is inputted into the first detection model to obtain the first relationship degree corresponding to the candidate image region.

During the first round of model training, because there is no previous round of model training, the object classification model can be trained based on the complete sample image, and each candidate image region of the sample image is scored using the object classification model (i.e., outputting the third relationship degree). For each sample image, the candidate image region having the third highest relationship degree is taken as the second image region, and the first round of model training is performed based on the second image region.

8. Take a model obtained by model training using a forward sample image group of the current sample image group in a current round of model training as the updated second detection model, and obtain, based on the updated second detection model, the second relationship degree corresponding to each candidate image region.

For example, during the second round of model training, when the current sample image group is an eighth sample image group, a model obtained by model training using the seventh sample image group during the second round of model training is obtained as the second detection model. During the third round of model training, when the current sample image group is a ninth sample image group, a model obtained by model training using the eighth sample image group during the third round of model training is obtained as the second detection model. The candidate image region corresponding to each sample image in the current sample image group is inputted into the second detection model to obtain the second relationship degree corresponding to the candidate image region.

9. Obtain a relationship degree change value based on the first relationship degree and the second relationship degree, and select a target image region including the target object from the candidate image region set based on the relationship degree change value.

The relationship degree change value is obtained by subtracting the first relationship degree from the second relationship degree. For each first sample image, a candidate image region with the largest relationship degree change value is taken as a region including the breast cancer in the first sample image.

10. Perform model training on the second detection model based on the target image region to obtain an updated first detection model corresponding to the first sample image.

11. Determine whether the first detection model converges.

If the first detection model converges, the updated first detection model is taken as the target detection model, that is, step 12 is performed. If the first detection model does not converge, step 4 is performed.

12. Take the updated first detection model as a target detection model.

During training of the object detection model, the samples are usually not dynamically updated, resulting in the initial sample being used as the training sample in the training of the object detection model. Because of the high cost of manually annotating the position of the target object in the sample image, for example, during annotation of the specific position of the target object in the sample image, it takes several minutes of professional annotators to accurately annotate, and the position annotation of the target object is not objective, and is greatly affected by subjective factors such as the level of the annotator, so it is very difficult to annotate large-scale target object positions in reality. Therefore, the position of the target object is often not annotated on the sample image during model training, and the entire sample image is taken as the image including the target object, which makes it difficult to guarantee the accuracy of the model.

Instead, the model training method provided in the embodiments of this application is adopted. When only image level annotation is given, the candidate image region that may contain the position of the target object such as the breast cancer is obtained through the unsupervised target candidate box technology. During the first round of training, the object classification model obtained by training using the complete sample image outputs the third relationship degree about inclusion of the target object in the candidate image region, and the image region including the target object may be selected based on the third relationship degree as the initial training sample for model training, to obtain a detection model obtained by the first round of model training.

In the subsequent model training, a candidate image region with a higher relationship degree change between two consecutive rounds of training is selected as a new positive sample under the training iteration step, so that the training sample of the object detection model can be dynamically updated. The relationship degree change between two consecutive rounds of training can reflect the evaluation of the quality of the candidate image region after the generalization performance of the object detection model in the candidate image region is enhanced. The candidate image region with more positive improvement in the relationship degree represents the highest quality considered by the object detection model between the last two rounds of training iterations, that is, the possibility including the target object is high. Therefore, the image region with higher confidence is taken as the image region including the target object, for model training. Therefore, in all rounds of model training, when the sample quality and detector capabilities can be improved together by continuously selecting positive samples of higher quality, so that the accuracy of the object detection model is close to the full supervision, i.e., the accuracy of the detection model obtained by training in the case of manually annotating the position of the target object, the need for model training to annotate the position of the target object in the sample image is greatly reduced.

Figure 11:
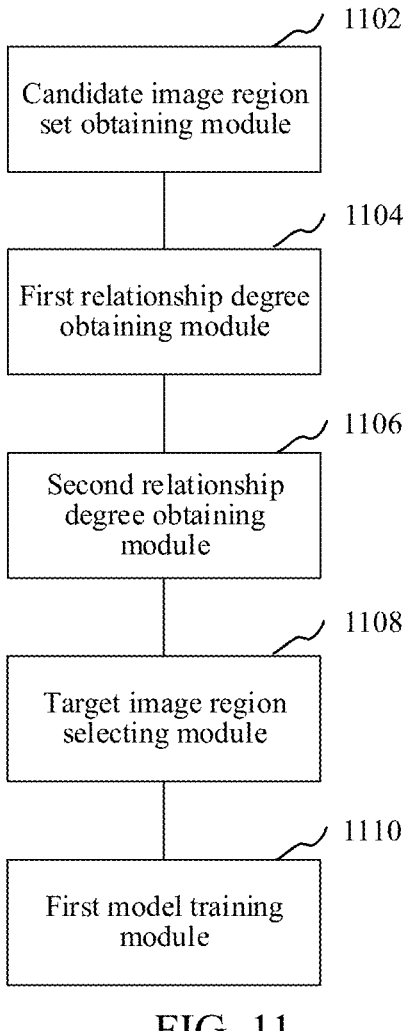
FIG. 11 is a structural block diagram of a detection model training apparatus according to some embodiments.

As shown in FIG. 11, in some embodiments, provided is a detection model training apparatus. The detection model training apparatus can be integrated in the server 120, and specifically includes a candidate image region set obtaining module 1102, a first relationship degree obtaining module 1104, a second relationship degree obtaining module 1106, a target image region selecting module 1108, and a first model training module 1110.

The candidate image region set obtaining module 1102 is configured to obtain a candidate image region set obtained by segmenting a first sample image, the candidate image region set including a plurality of candidate image regions.

The first relationship degree obtaining module 1104 is configured to obtain a first relationship degree corresponding to each candidate image region, the first relationship degree being a relationship degree about inclusion of a target object in the candidate image region that is outputted by inputting the candidate image region into a first detection model, and the first detection model being obtained by model training based on the first sample image.

The second relationship degree obtaining module 1106 is configured to obtain a second relationship degree corresponding to each candidate image region, the second relationship degree being a relationship degree about inclusion of the target object in the candidate image region that is outputted by inputting the candidate image region into a second detection model, and the second detection model being obtained by model training of the first detection model using a second sample image.

The target image region selecting module 1108 is configured to obtain relationship degree change value based on the first relationship degree and the second relationship degree, and select a target image region including the target object from the candidate image region set based on the relationship degree change value.

The first model training module 1110 is configured to perform model training based on the target image region to obtain a target detection model.

In some embodiments, the object detection model training apparatus further includes: a sample image set obtaining module, configured to obtain a sample image set, and obtain an updated first sample image and an updated second sample image by division based on the sample image set. The sample image set includes a plurality of sample images. The first model training module 1110 includes: an update module, configured to perform model training on the second detection model based on the target image region, to obtain the updated first detection model corresponding to the first sample image; and a returning module, configured to return to the step of obtaining the updated first sample and the updated second sample image by division based on the sample image set, until the updated first detection model converges and the target detection model is obtained.

In some embodiments, the sample image set obtaining module is configured to: divide the sample image set into a plurality of sample image groups; and sequentially obtain a current sample image group from the sample image set by taking each sample image group as a granularity of model parameter adjustment, sample images in the current sample image group being first sample images, and sample images in a non-current sample image group being second sample images. The returning module is configured to: return to the step of sequentially obtaining a current sample image group from the sample image set by taking each sample image group as a granularity of model parameter adjustment, sample images in the current sample image group being first sample images, and sample images in a non-current sample image group being second sample images.

In some embodiments, the first relationship degree obtaining module 1104 is configured to: take a model obtained by model training using the same sample image group in the previous round of model training as the updated first detection model, and obtain, based on the updated first detection model, the first relationship degree corresponding to each candidate image region.

The second relationship degree obtaining module 1106 is configured to: take a model obtained by model training using a forward sample image group of the current sample image group in a current round of model training as the updated second detection model, and obtain, based on the updated second detection model, the second relationship degree corresponding to each candidate image region.

In some embodiments, the object detection model training apparatus further includes:

a classification model obtaining module, configured to obtain a target image classification model;

a third relationship degree obtaining module, configured to input the candidate image region corresponding to each sample image in the sample set into the target image classification model, and output a third relationship degree about the candidate image region of each sample image being a region where the target object is located;

a second image region selecting module, configured to select a second image region including the target object from the candidate image region set based on the third relationship degree; and a second model training module, configured to perform model training based on the second image region, to obtain a detection model obtained by a first round of model training.

In some embodiments, the target image region selecting module 1108 is configured to select a candidate image region with the relationship degree change value satisfying a preset change condition from the candidate image region set as the target image region including the target object, the preset change condition including at least one of a condition that a relationship degree rank is ahead of a preset rank or a condition that the relationship degree change value is greater than a preset change value, and relationship degree change values being sorted in descending order.

In some embodiment, the target image region selecting module 1108 is configured to subtract the first relationship degree from the second relationship degree or divide the second relationship degree by the first relationship degree, to obtain a relationship degree change value.

In some embodiments, the object detection model training apparatus further includes:

an image overlapping degree obtaining module, configured to obtain an image overlapping degree of the target image region and each candidate image region; and a third image region obtaining module, configured to obtain a candidate image region with the image overlapping degree being greater than a first preset overlapping degree as a third image region.

The first model training module 1110 is configured to:

take the third image region and the target image region as positive sample image regions, and perform model training based on the positive sample image regions to obtain a target detection model.

In some embodiments, the object detection model training apparatus further includes:

an image overlapping degree obtaining module, configured to obtain an image overlapping degree of the target image region and each candidate image region; and a fourth image region obtaining module, configured to obtain a candidate image region with the image overlapping degree being less than a second preset overlapping degree as a fourth image region, the second preset overlapping degree being less than or equal to the first preset overlapping degree.

The first model training module 1110 is configured to: take the fourth image region as a negative sample image region, and take the target image region group as a positive sample image region; and perform model training based on the positive sample image region and the negative sample image region to obtain a target detection model.

In some embodiments, the object detection model training apparatus further includes:

a to-be-detected image obtaining module, configured to obtain a to-be-detected image, and segment the to-be-detected image into a plurality of first image regions;

a target relationship degree obtaining module, configured to input each first image region into the target detection model to obtain a target relationship degree about inclusion of the target object in each first image region; and a position detection module, configured to select an image region including the target object from the first image regions based on the target relationship degree, to obtain a position of the target object in the to-be-detected image.

Figure 12:
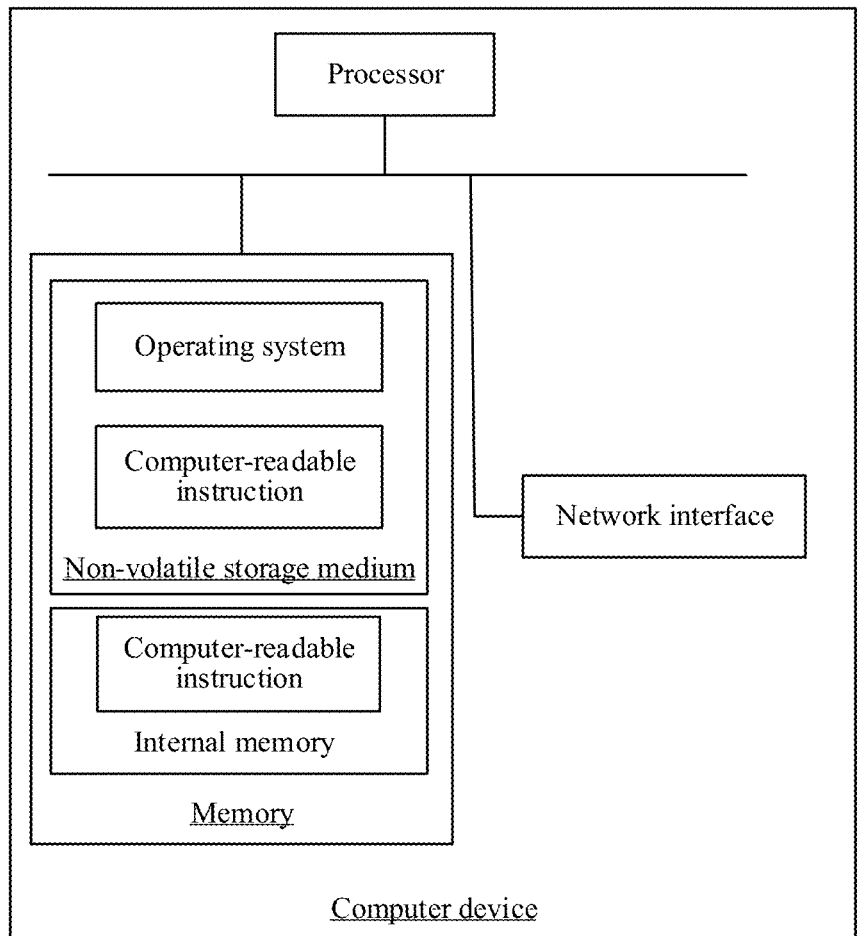
FIG. 12 is a block diagram of an internal structure of a computer device according to some embodiments.

FIG. 12 is a diagram of an internal structure of a computer device according to some embodiments. The computer device may be specifically the server 120 in FIG. 1. As shown in FIG. 12, the computer device includes a processor, a memory, and a network interface that are connected through a system bus. The memory includes a non-volatile (e.g., non-transitory) storage medium and an internal memory. The non-volatile storage medium of the computer device stores an operating system, and may further store computer-readable instructions. The computer-readable instructions, when executed by the processor, may cause the processor to implement a detection model training method. The internal memory may also store computer-readable instructions, and the computer-readable instructions, when executed by the processor, cause the processor to perform the detection model training method.

A person skilled in the art may understand that, the structure shown in FIG. 12 is an exemplary block diagram of a part of a structure related to a solution of this application and does not limit the computer device to which the solution of this application is applied. Specifically, the computer device may include more or fewer components than those in the drawings, or include a combination of some components, or include different component layouts.

In some embodiments, the detection model training apparatus provided in this application may be implemented in a form of computer-readable instructions, and the computer-readable instructions may run on the computer device shown in FIG. 12. A memory of the computer device can store program modules that form the detection model training apparatus, for example, a candidate image region set obtaining module 1102, a first relationship degree obtaining module 1104, a second relationship degree obtaining module 1106, a target image region selecting module 1108, and a first model training module 1110, as shown in FIG. 11. The computer-readable instructions formed by the program modules cause the processor to perform steps in the detection model training method in embodiments of this application described in this specification.

In some embodiments, provided is a computer device, including a memory and a processor, the memory having computer-readable instructions stored thereon, and the computer-readable instructions, when executed by the processor, causing the processor to perform steps of the foregoing detection model training method. Herein, the steps of the detection model training method may be the steps of the detection model training method in the foregoing embodiments.

In some embodiments, provided is a non-transitory computer-readable storage medium, having computer-readable instructions stored thereon, the computer-readable instructions, when executed by the processor, causing the processor to perform the steps in the foregoing detection model training method. Herein, the steps of the detection model training method may be the steps of the detection model training method in the foregoing embodiments.

It is to be understood that although the steps in the flowcharts of the embodiments of this application are displayed in sequence according to arrows, the steps are not necessarily performed in the sequence indicated by the arrows. Unless otherwise explicitly specified in this application, execution of the steps is not strictly limited, and the steps may be performed in other sequences. In addition, at least some of the steps in the foregoing embodiments may include a plurality of substeps or a plurality of stages. These substeps or stages are not necessarily completed at the same moment, but may be performed at different moments. Besides, these substeps or stages may not be necessarily performed sequentially, but may be performed in turn or alternately with other steps or at least some of substeps or stages of other steps.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Each reference to the memory, the storage, the database, or other media used in the embodiments provided in this application may include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments show several implementations of this application and are described in detail, which, however, are not to be construed as a limitation to the patent scope of this application. For a person of ordinary skill in the art, several transformations and improvements can be made without departing from the idea of this application. The transformations and improvements fall within the protection scope of this application. Therefore, the protection scope of the patent of this application shall be subject to the appended claims.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs detection and/or training. In practical application, the foregoing functions may be allocated to and completed by different functional modules according to requirements, that is, an inner structure of a device is divided into different functional modules to implement all or a part of the functions described above.

What is claimed is:

1. A method for detecting a target object within a target image, comprising:

obtaining a target image;

segmenting the target image into a plurality of first image regions;

inputting each first image region into a target detection model to obtain a target relationship degree about inclusion of the target object in each first image region; and selecting an image region comprising the target object from the plurality of first image regions based on the target relationship degree, to obtain a position of the target object in the to-be-detected image, wherein the target detection model is trained by:

segmenting a first sample image into a plurality of candidate image regions;

for each of the plurality of candidate image regions:

obtaining a first relationship degree corresponding to the candidate image region using a first detection model, based on inclusion of a predefined object in the candidate image region;

obtaining a second relationship degree corresponding to the candidate image region using a second detection model, based on inclusion of the predefined object in the candidate image region; and obtaining a relationship degree change value based on the first relationship degree and the second relationship degree;

selecting, from the plurality of candidate image regions, a first candidate image region as a target image region in accordance with a determination that the relationship degree change value corresponding to the first candidate image region satisfies a predefined threshold; and performing model training based on the target image region to obtain the target detection model.

2. The method according to claim 1, wherein selecting the first candidate image region as the target image region in accordance with a determination that the relationship degree change value corresponding to the first candidate image region satisfies a predefined threshold further comprises:

selecting the first candidate image region in accordance with a determination that the first candidate image region satisfies a preset change condition that comprises at least one of a condition that a relationship degree rank is ahead of a preset rank or a condition that the relationship degree change value is greater than the predefined threshold, and relationship degree change values being sorted in descending order.

3. The method according to claim 1, wherein obtaining the relationship degree change value further comprises:

subtracting the first relationship degree from the second relationship degree.

4. The method according to claim 1, wherein obtaining the relationship degree change value further comprises:

dividing the second relationship degree by the first relationship degree to obtain the relationship degree change value.

5. The method according to claim 1, further comprising:

obtaining an image overlapping degree of the target image region and each candidate image region; and obtaining a candidate image region with the image overlapping degree being greater than a first preset overlapping degree as a third image region; and performing model training based on the target image region to obtain a target detection model further comprises:

taking the third image region and the target image region as positive sample image regions, and performing model training based on the positive sample image regions to obtain the target detection model.

6. The method according to claim 1, further comprising:

obtaining an image overlapping degree of the target image region and each candidate image region; and obtaining a candidate image region with the image overlapping degree being less than a second preset overlapping degree as a fourth image region; and performing model training based on the target image region to obtain the target detection model further comprises:

taking the fourth image region as a negative sample image region, and taking the target image region group as a positive sample image region; and performing model training based on the positive sample image region and the negative sample image region to obtain the target detection model.

7. A computer device, comprising:

one or more processors; and memory storing one or more programs, that, when executed by the one or more processors, cause the one or more processors to perform operations comprising:

obtaining a target image;

segmenting the target image into a plurality of first image regions;

inputting each first image region into a target detection model to obtain a target relationship degree about inclusion of the target object in each first image region; and selecting an image region comprising the target object from the plurality of first image regions based on the target relationship degree, to obtain a position of the target object in the to-be-detected image, wherein the target detection model is trained by:

segmenting a first sample image into a plurality of candidate image regions;

for each of the plurality of candidate image regions:

obtaining a first relationship degree corresponding to the candidate image region using a first detection model, based on inclusion of a predefined object in the candidate image region;

obtaining a second relationship degree corresponding to the candidate image region using a second detection model, based on inclusion of the predefined object in the candidate image region; and obtaining a relationship degree change value based on the first relationship degree and the second relationship degree;

selecting, from the plurality of candidate image regions, a first candidate image region as a target image region in accordance with a determination that the relationship degree change value corresponding to the first candidate image region satisfies a predefined threshold; and performing model training based on the target image region to obtain the target detection model.

8. The computer device according to claim 7, wherein selecting the first candidate image region as the target image region in accordance with a determination that the relationship degree change value corresponding to the first candidate image region satisfies a predefined threshold further comprises:

selecting the first candidate image region in accordance with a determination that the first candidate image region satisfies a preset change condition that comprises at least one of a condition that a relationship degree rank is ahead of a preset rank or a condition that the relationship degree change value is greater than the predefined threshold, and relationship degree change values being sorted in descending order.

9. The computer device according to claim 7, wherein obtaining the relationship degree change value further comprises:

subtracting the first relationship degree from the second relationship degree.

10. The computer device according to claim 7, wherein obtaining the relationship degree change value further comprises:

dividing the second relationship degree by the first relationship degree to obtain the relationship degree change value.

11. The computer device according to claim 7, wherein the target detection model is trained by:

obtaining an image overlapping degree of the target image region and each candidate image region; and obtaining a candidate image region with the image overlapping degree being greater than a first preset overlapping degree as a third image region; and performing model training based on the target image region to obtain a target detection model further comprises:

taking the third image region and the target image region as positive sample image regions, and performing model training based on the positive sample image regions to obtain the target detection model.

12. The computer device according to claim 7, wherein the target detection model is trained by:

obtaining an image overlapping degree of the target image region and each candidate image region; and obtaining a candidate image region with the image overlapping degree being less than a second preset overlapping degree as a fourth image region; and performing model training based on the target image region to obtain the target detection model further comprises:

taking the fourth image region as a negative sample image region, and taking the target image region group as a positive sample image region; and performing model training based on the positive sample image region and the negative sample image region to obtain the target detection model.

13. A non-transitory computer readable storage medium storing instructions that, when executed by one or more processors of a computer device, cause the one or more processors to perform a method for detecting a target object within a target image including:

obtaining a target image;

segmenting the target image into a plurality of first image regions;

inputting each first image region into a target detection model to obtain a target relationship degree about inclusion of the target object in each first image region; and selecting an image region comprising the target object from the plurality of first image regions based on the target relationship degree, to obtain a position of the target object in the to-be-detected image, wherein the target detection model is trained by:

segmenting a first sample image into a plurality of candidate image regions;

for each of the plurality of candidate image regions:

obtaining a first relationship degree corresponding to the candidate image region using a first detection model, based on inclusion of a predefined object in the candidate image region;

obtaining a second relationship degree corresponding to the candidate image region using a second detection model, based on inclusion of the predefined object in the candidate image region; and obtaining a relationship degree change value based on the first relationship degree and the second relationship degree;

selecting, from the plurality of candidate image regions, a first candidate image region as a target image region in accordance with a determination that the relationship degree change value corresponding to the first candidate image region satisfies a predefined threshold; and performing model training based on the target image region to obtain the target detection model.

14. The non-transitory computer readable storage medium according to claim 5, wherein selecting the first candidate image region as the target image region in accordance with a determination that the relationship degree change value corresponding to the first candidate image region satisfies a predefined threshold further comprises:

selecting the first candidate image region in accordance with a determination that the first candidate image region satisfies a preset change condition that comprises at least one of a condition that a relationship degree rank is ahead of a preset rank or a condition that the relationship degree change value is greater than the predefined threshold, and relationship degree change values being sorted in descending order.

15. The non-transitory computer readable storage medium according to claim 5, wherein obtaining the relationship degree change value further comprises:

subtracting the first relationship degree from the second relationship degree.

16. The non-transitory computer readable storage medium according to claim 5, wherein obtaining the relationship degree change value further comprises:

dividing the second relationship degree by the first relationship degree to obtain the relationship degree change value.

17. The non-transitory computer readable storage medium according to claim 5, wherein the target detection model is trained by:

obtaining an image overlapping degree of the target image region and each candidate image region; and obtaining a candidate image region with the image overlapping degree being greater than a first preset overlapping degree as a third image region; and performing model training based on the target image region to obtain a target detection model further comprises:

taking the third image region and the target image region as positive sample image regions, and performing model training based on the positive sample image regions to obtain the target detection model.

* * * * *